(12) United States Patent
Ota

(10) Patent No.: US 6,419,575 B1
(45) Date of Patent: Jul. 16, 2002

(54) CUTTING METHOD OF SALMON OVARY AND APPARATUS FOR CARRYING OUT CUTTING METHOD

(75) Inventor: Yoshiharu Ota, Hokkaido (JP)

(73) Assignee: Sato Suisan Kabushiki Kaisha, Ishikari (JP)

(*) Notice: Subject to any disclaimer, the term of this patent is extended or adjusted under 35 U.S.C. 154(b) by 0 days.

(21) Appl. No.: 09/638,811

(22) Filed: Aug. 14, 2000

(51) Int. Cl.[7] ............................ A22C 21/06; A22C 25/14
(52) U.S. Cl. ................................... 452/110; 452/106
(58) Field of Search ............................... 452/106, 1, 12, 452/29, 110

(56) References Cited

U.S. PATENT DOCUMENTS

| | | | | |
|---|---|---|---|---|
| 743,742 A | * | 11/1903 | Munn | 452/149 |
| 1,998,357 A | * | 4/1935 | Carlson | |
| 5,358,441 A | * | 10/1994 | Hjorth | 452/180 |
| 5,753,298 A | | 5/1998 | Ota | |
| 5,860,348 A | * | 1/1999 | Morse et al. | 83/864 |
| 5,946,995 A | * | 9/1999 | Michell et al. | 83/425.3 |

FOREIGN PATENT DOCUMENTS

NO 64292 A * 1/1942 .................. 452/149

* cited by examiner

Primary Examiner—Charles T. Jordan
Assistant Examiner—Judith Nelson
(74) Attorney, Agent, or Firm—Jordan and Hamburg LLP

(57) ABSTRACT

When a salmon ovary is cut, the salmon ovary is held and transferred and in a whole state, the ovary is locally pushed at predetermined gaps, eggs in a membrane are divided into a plurality of clusters by this pushing operation, and the pushed portions of the membrane are then cut.

14 Claims, 17 Drawing Sheets

CUTTING METHOD OF SALMON OVARY AND APPARATUS FOR CARRYING OUT CUTTING METHOD

BACKGROUND

Two salmon ovaries (roes) can be obtained from one female salmon. The roe comprises thousands of eggs or berries coated with membrane. A length of the roe is about 20 to 30 cm, a diameter of the center portion is 5 to 8 cm, and opposite ends thereof are tapered. The obtained roe is subjected to a predetermined processing such as kenching or salt down, and is provided as food. This processing method is known from U.S. Pat. No. 5753298, Canadian Patent No. 2178704 and the like. In Japan, the roe is widely used as an ingredient of sushi and the like, and is known as upscale dainty bits. In recent years, the roes are known foods also in U.S., Canada, Norway and the like where Japanese foods became common.

In Japan, the roes are valuable as gifts, and when eating the roe, it is cut into bite-size portions, and the roes are eaten little by little. Therefore, the roe is previously cut into small pieces and supplied on the table. However, when the roe is cut into small pieces, not only a membrane of the roe is cut, but also eggs or berries are cut. Therefore, a tasty ingredient liquor (drip) flows out or leaks out of the eggs, and this makes a kitchen dirty and thus, many housewives do not like the cutting operation of the roe. As described above, if the roe is manually cut, the tasty ingredient liquor may flow out and a kitchen may be made dirty. It is also technically difficult to uniformly cut the roe and there is a problem that bacteria may attach to the roe from hands, and it is necessary to take measures in terms of health.

OBJECT AND SUMMARY OF THE INVENTION

Thereupon, it is an object of the present invention to overcome the drawbacks of the conventional technique, and to provide a cutting method for cutting a salmon ovary and an apparatus for carrying out the cutting method capable of cutting a roe into a plurality of pieces such that liquor included in eggs or berries is prevent from flowing out as much as possible.

It is another object of the invention to provide a cutting method for cutting a salmon ovary and an apparatus for carrying out the cutting method capable of cutting a roe into small pieces as uniform as possible. Another object of the invention is to provide a cutting method for cutting a salmon ovary and an apparatus for carrying out the cutting method suitable for health and capable of minimizing bacteria contamination by cutting the roe mechanically.

According to a cutting method for cutting a salmon ovary of the present invention, the salmon ovary is held and transferred and in a whole state, the ovary is locally pushed at predetermined gaps, eggs in a membrane are divided into a plurality of clusters by this pushing operation, and the pushed portions of the membrane are then cut to separate the plurality of clusters.

A cutting apparatus for cutting a salmon ovary of the present invention comprises a bucket portion for holding the salmon ovary, transfer means for transferring the bucket portion, and cutter means for cutting the ovary into a plurality of clusters. The bucket portion comprises a plurality of bucket pieces disposed at predetermined gaps from one another. The cutter means includes a pushing means and a blade. The cutter means is located in the gap between the bucket pieces. The pushing portion of the cuter means divides eggs by pushing a membrane of the salmon ovary, and the blade cuts the pushed membrane which exists between the eggs. Each of the bucket pieces includes a receiving plate and a pushing plate. The transfer means comprises driving and follower sprockets, a chain wound around these sprockets, a mounting plate mounted to the chain, and a chopping board secured to the mounting plate.

There are various types of the cutter pieces. In a first type, the cutter piece is provided only at its tip end with a blade. In a second type, the cutter piece is provided at its tip end with a bent portion, and the bent portion is formed with the blade. In a third type, the cutter piece comprises a rotating blade and pushing means, and the rotating blade and a pushing face of the pushing means are located on the same plane.

BRIEF DESCRIPTION OF THE DRAWINGS

FIGS. 1 to 17 show a first embodiment of a cutting apparatus of the present invention, wherein FIG. 1 is a perspective view showing an entire structure of the cutting apparatus;

FIG. 2 is a sectional view showing a driving ratchet in transfer means;

FIG. 3 is a sectional view showing a mounting state of a bucket portion on the transfer means;

FIG. 4 is a front view showing a positional relation between the bucket, cutter means and a state in which the bucket is mounted to a chain of the transfer means;

FIG. 5 is an exploded view showing a state in which the bucket piece is mounted to a chain of the transfer means;

FIG. 6 is a front view of a cutter piece;

FIG. 7 is an enlarged sectional view taken along the line a—a in FIG. 6;

FIG. 8 is an enlarged sectional view taken along the line b—b in FIG. 6;

FIG. 9 is a sectional view of a roe which is an ovary of a salmon;

FIG. 10 is a front view showing a procedure for cutting the roe with the cutter;

FIG. 11 is a front view showing the roe pushed in the procedure for cutting the roe with the cutter;

FIG. 12 is a front view showing a state immediately before a membrane of the roe is cut in the procedure for cutting the roe with the cutter;

FIG. 13 is a perspective view showing the state shown in FIG. 11;

FIG. 14 is a perspective view showing the state shown in FIG. 12;

FIG. 15 is a perspective view showing a state immediately after the membrane of the roe was cut;

FIG. 16 is a plan view showing the entire state immediately after the membrane of the roe was cut; and FIG. 17 is a partially enlarged front view of the state immediately after the membrane of the roe was cut.

FIGS. 18 to 26 show a second embodiment of a cutting apparatus of the present invention, wherein FIG. 18 is a front view showing a positional relation between the bucket, cutter means and a state in which the bucket is mounted to a chain of the transfer means;

FIG. 19 is an enlarged front view of a cutter;

FIG. 20 is an enlarged sectional view taken along the line c—c in FIG. 19;

FIG. 21 is an enlarged sectional view taken along the line d—d in FIG. 19;

FIG. 22 is an enlarged sectional view taken along the line e—e in FIG. 19;

FIG. 23 is a front view showing the roe pushed in the procedure for cutting the roe with the cutter;

FIG. 24 is a front view showing a state immediately before a membrane of the roe is cut in the procedure for cutting the roe with the cutter;

FIG. 25 is a perspective view showing a state immediately after the membrane of the roe was cut; and FIG. 26 is a partially enlarged plan view showing the pushing state shown in FIG. 23.

FIGS. 27 to 33 show a third embodiment of a cutting apparatus of the present invention, wherein FIG. 27 is a perspective view showing an entire structure of the cutting apparatus;

FIG. 28 is a front view showing a positional relation between the bucket, cutter means and a state in which the bucket is mounted to a chain of the transfer means;

FIG. 29 is an enlarged plane view showing the positional relation between the bucket portion and the cutter means;

FIG. 30 is a front view showing the roe pushed in the procedure for cutting the roe with the cutter;

FIG. 31 is a front view showing a state immediately before a membrane of the roe is cut in the procedure for cutting the roe with the cutter;

FIG. 32 is a perspective view showing a state immediately after the membrane of the roe was cut; and FIG. 33 is a partially enlarged front view showing the pushing state shown in FIG. 31.

DETAILED DESCRIPTION

First, a structure of a cutting apparatus of ovaries, i.e., roes of salmons of the present invention will be explained. A structure of the apparatus according to a first embodiment is as follows.

Figure 1:
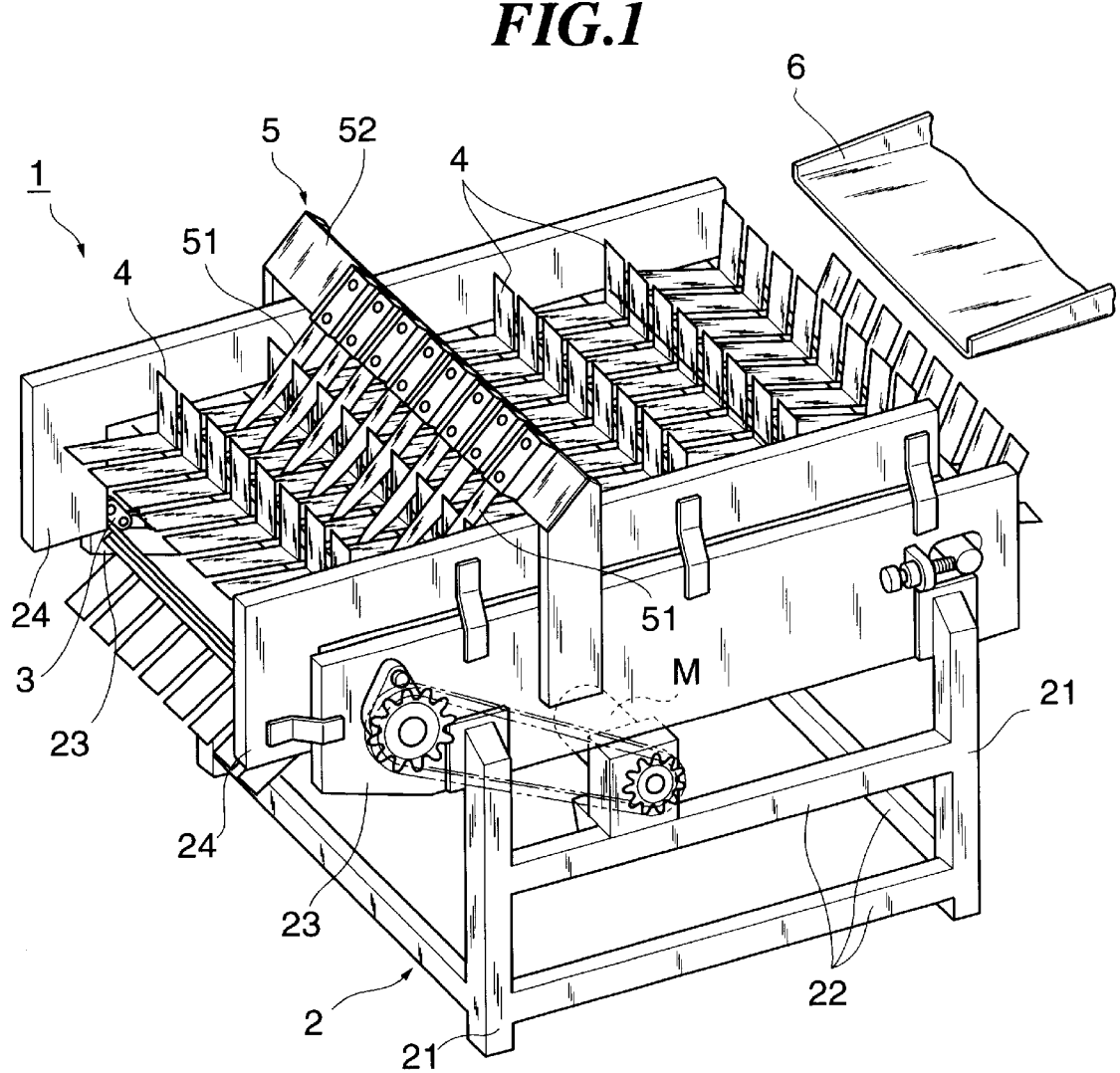

In FIG. 1, a cutting apparatus 1 comprises a frame 2, transfer means 3 mounted to the frame 2, a bucket portion 4 mounted to the transfer means 3, and cutter means 5 for cutting roes transferred by the bucket portion 4.

The frame 2 comprises legs 21 located at four corners, and cross-bars 22 connecting the legs 21 to one another. Upper portions of the legs 21 hold side plates 23 which are opposed to each other. Each of the side plates 23 includes a bottom plate. The side plates 23 respectively support supporting plates 24 which are opposed to each other.

Figure 2:
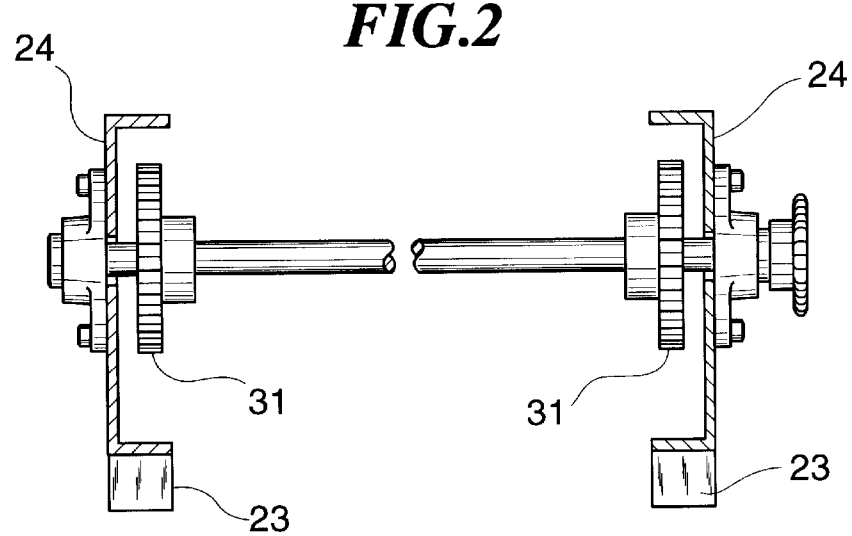
Figure 3:
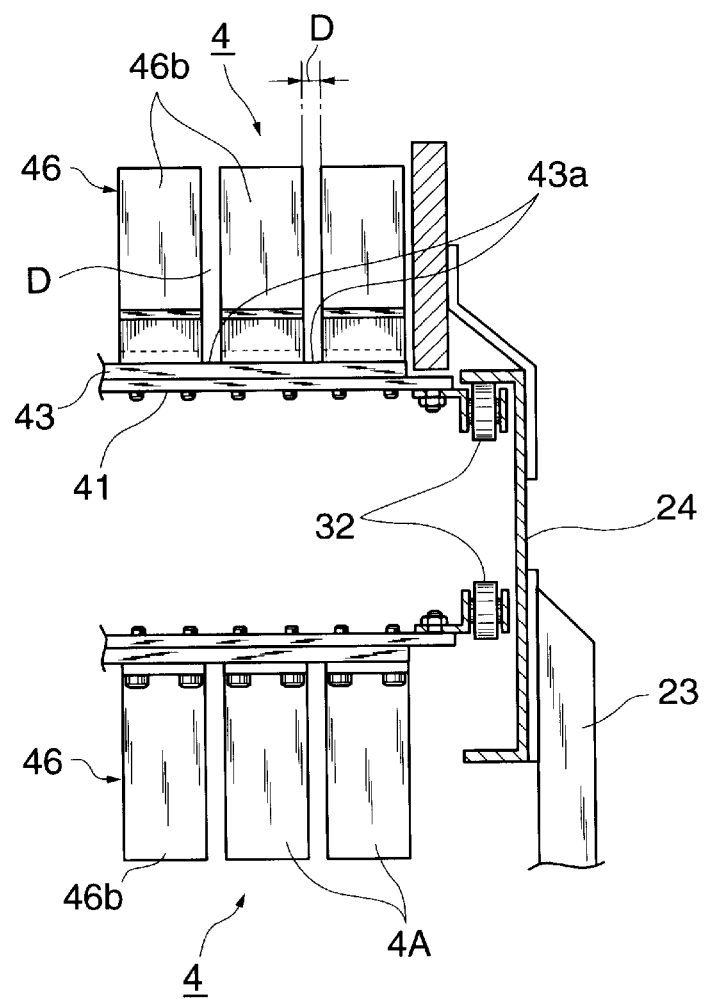
Figure 4:
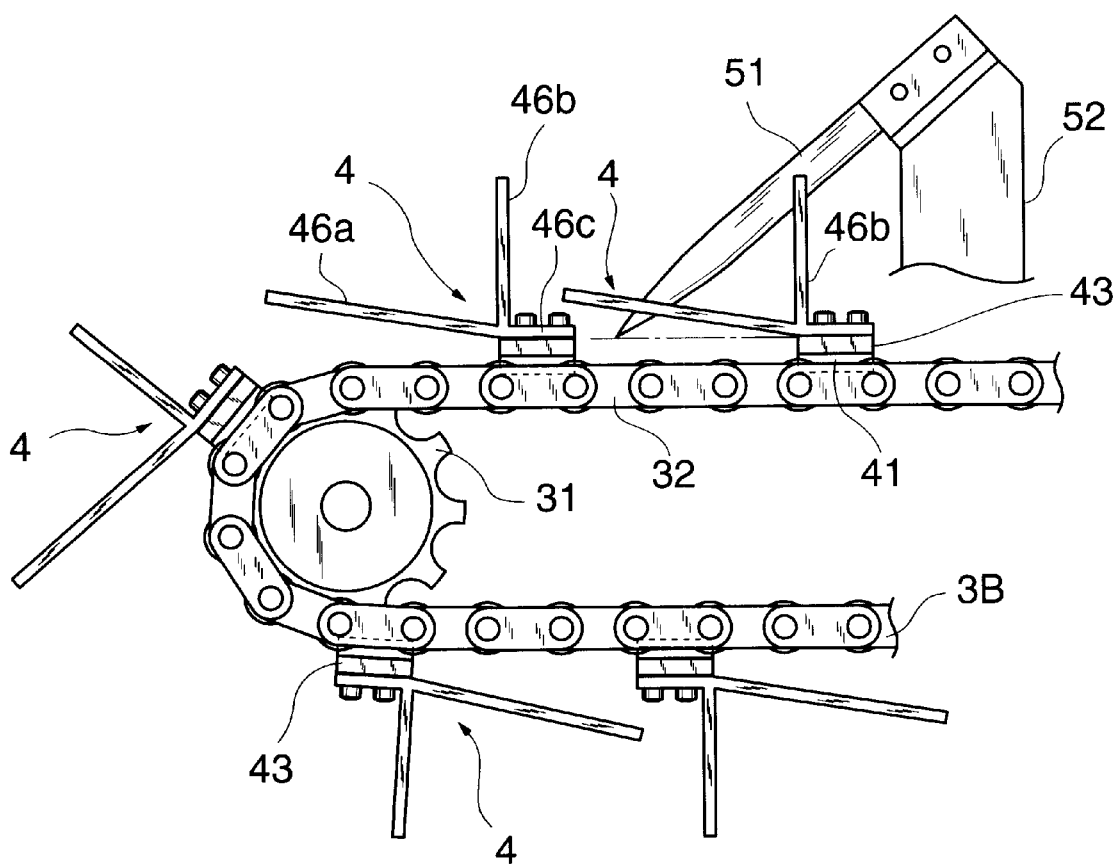

The transfer means 3 has the following structure. As shown in FIGS. 2 and 3, driving sprockets 31 and follower sprockets (not shown) are rotatably provided between the opposed supporting plates 24. Each driving sprocket 31 is rotated by a driving motor M shown in FIG. 1, and a chain 32 is wound between the driving sprocket 31 and the follower sprocket as shown in FIG. 4. Therefore, the chain 32 moves as the driving sprockets 31 rotates.

Figure 5:
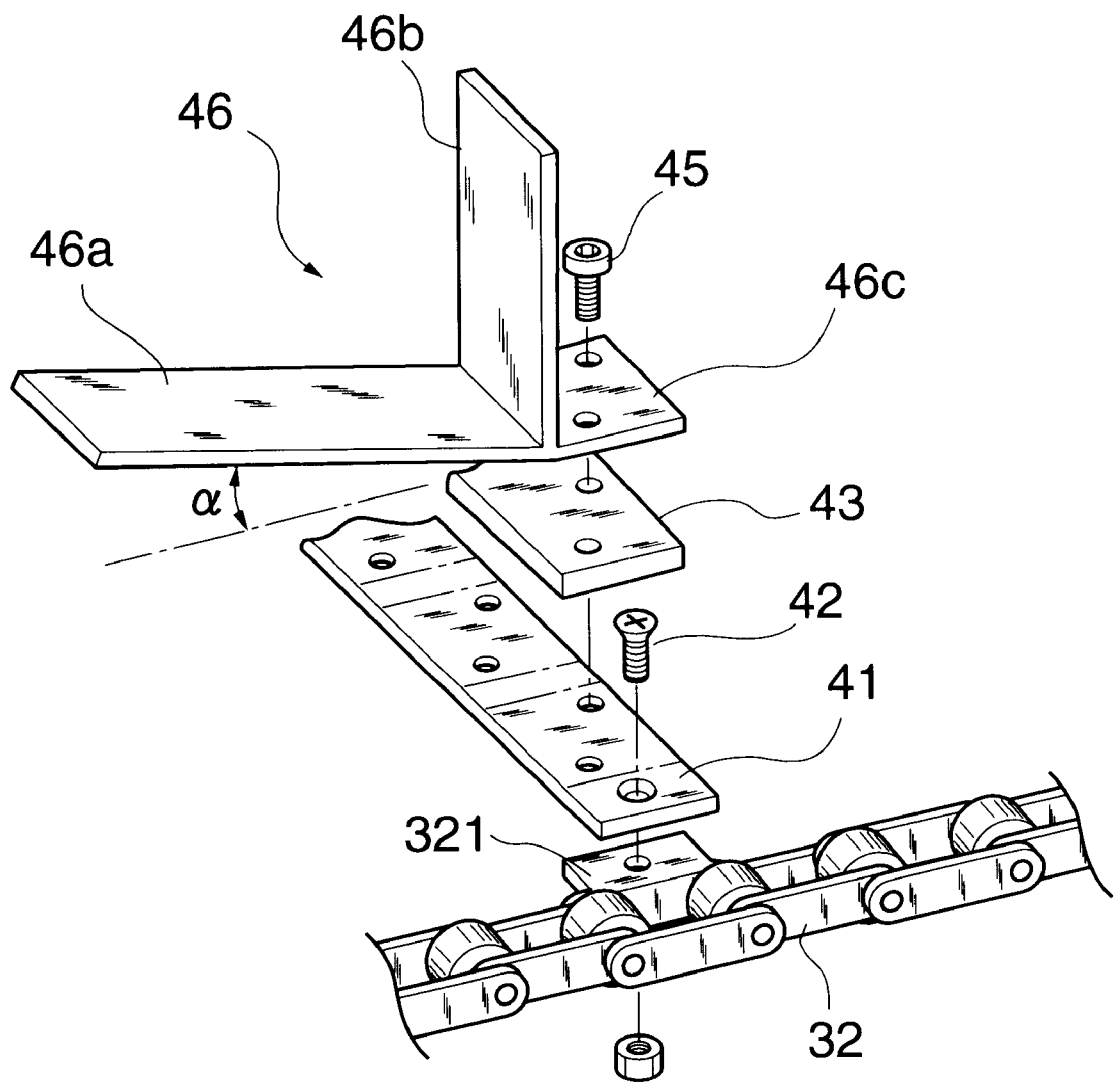

Next, a structure of the bucket portion 4 will be explained. As shown in FIGS. 4 and 5, mounting plates 41 are provided between the left and right chains 32 at predetermined distanced from one another. Ends of each of the mounting plates 41 are connected to mounting plates 321 of the chains 32 by means of screws 42. A chopping board 43 is placed on an upper face of the mounting plate 41. As shown in FIG. 2, a bucket portion 4 comprising a plurality of bucket pieces 44 is mounted to an upper face of the chopping board 43 by means of a fixing screw 45. As shown in FIG. 5, each of the bucket pieces 44 comprises a receiving plate 46a and a pushing plate 46b and formed into a substantially L-shape. The receiving plate 46a is extended rearward (rightward in FIG. 5) from the pushing plate 46b, and this extended portion is a mounting portion 46c for mounting the bucket piece 46 to the chopping board 43. The receiving plate 46a is inclined slightly upward at an angle α from a horizontal direction toward the traveling direction. The plurality of bucket pieces 46 are mounted to the chopping board 43 at predetermined distances D from one another as shown in FIG. 3. Therefore, a portion 43a of the chopping board 43 is exposed from each the distance D.

Figure 6:
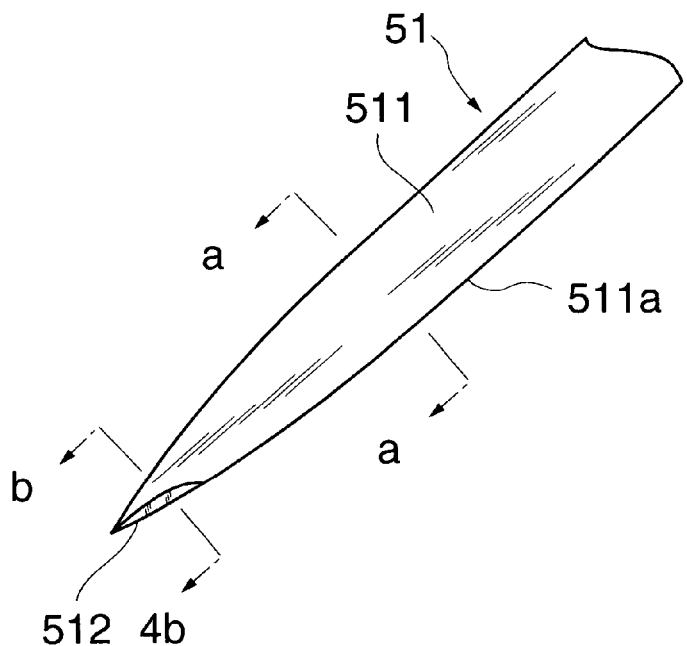
Figure 7:
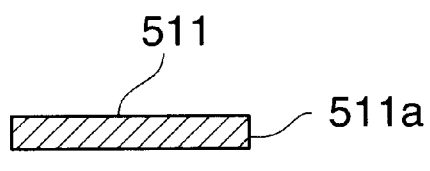
Figure 8:
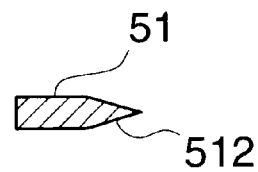

Next, the cutter means 5 will be explained. As shown in FIGS. 1, 4 and 6, the cutter means 5 comprises a plurality of (seven in FIG. 1) cutter pieces 51. As shown in FIG. 1, each of the cutter pieces 51 is supported by a portal supporting frame 52 secured to the side plates 23 of the frame 2. The cutter pieces 51 are inclined and suspended toward the bucket portion 4 at predetermined distances from one another. Each the cutter piece 51 is inserted into the distance D between the receiving plate 46a and the pushing plate 46b, and a tip end of the cutter piece 51 is located at such a height that the tip end can touch the chopping board 43. As shown in FIG. 6, the entire cutter piece 51 is formed such that the tip end thereof is sharp, the cutter piece 51 comprises a pushing portion 511 and a blade 512 formed on only the tip end portion. The cross section of the pushing portion 511 is of plate-like shape, one end face thereof is a pushing face 511a, and a tip end of the blade 512 is sharp as shown in FIG. 8.

Figure 9:
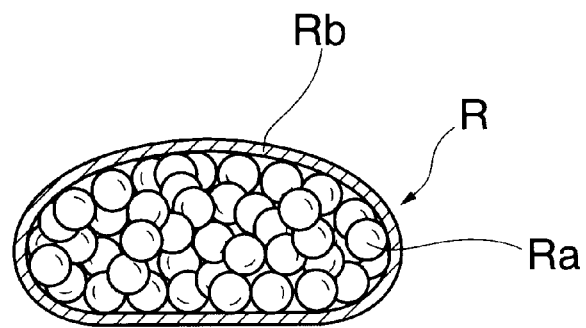
Figure 10:
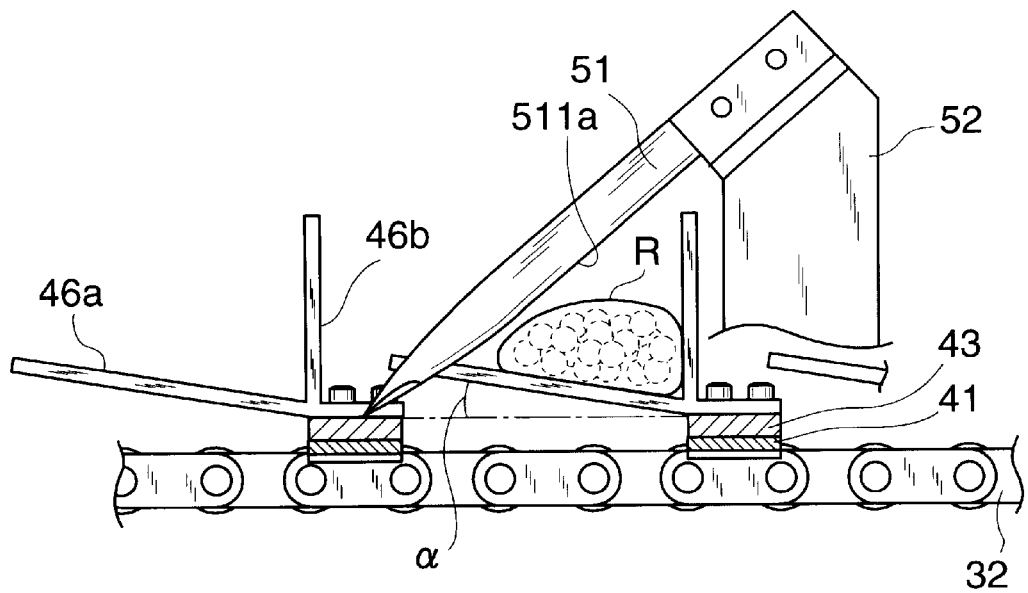
Figure 11:
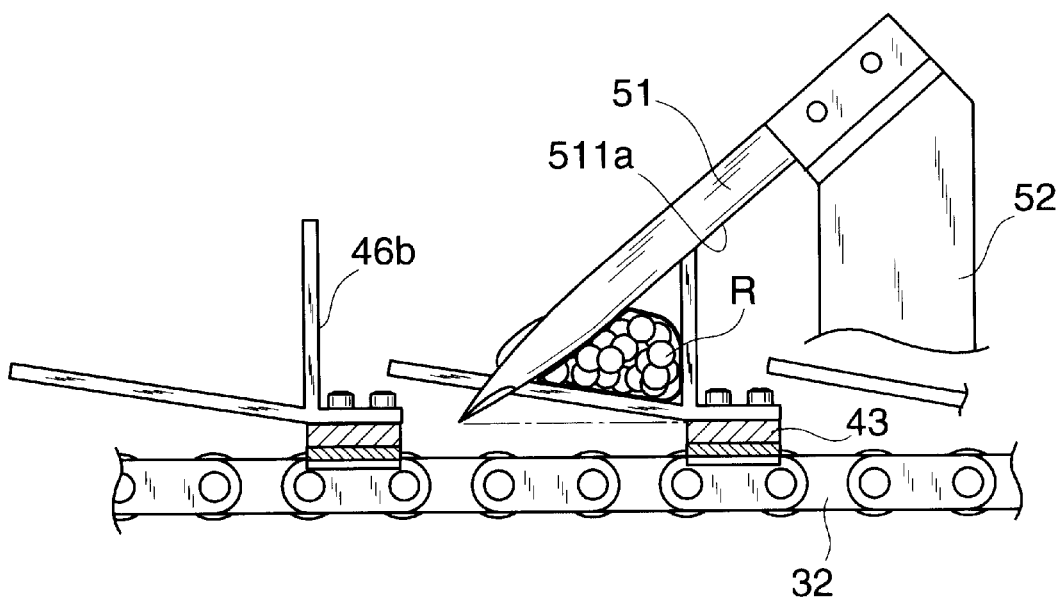
Figure 12:
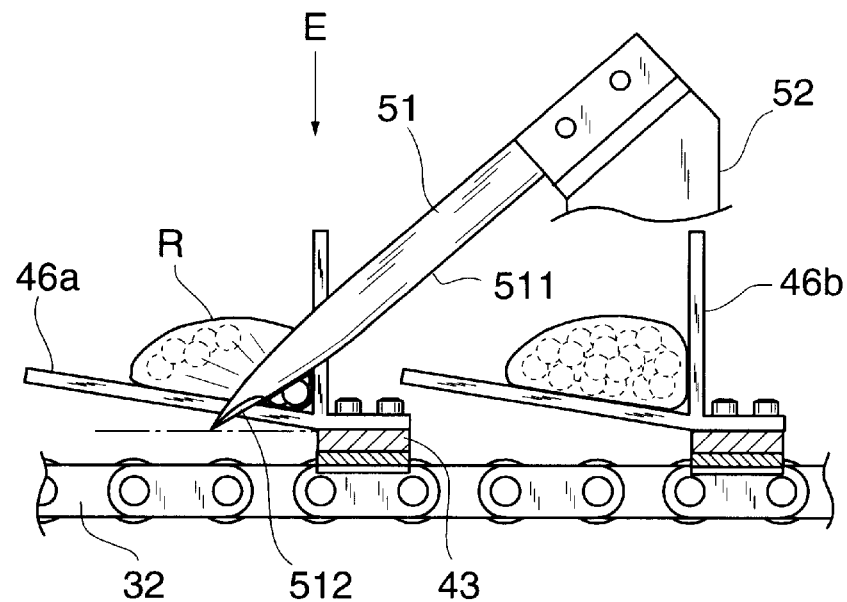
Figure 13:
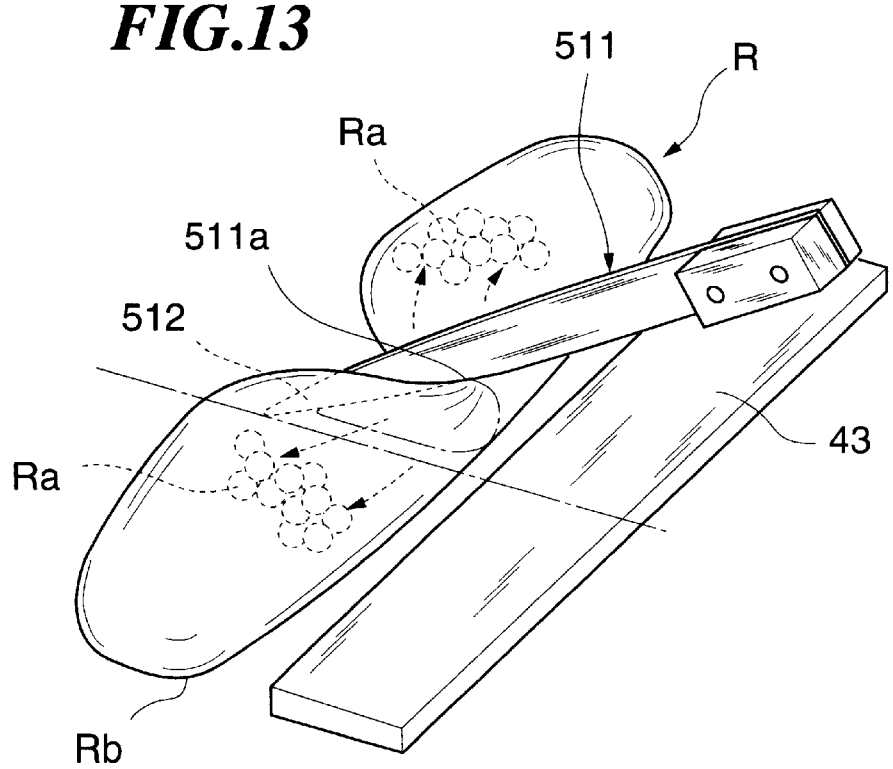
Figure 14:
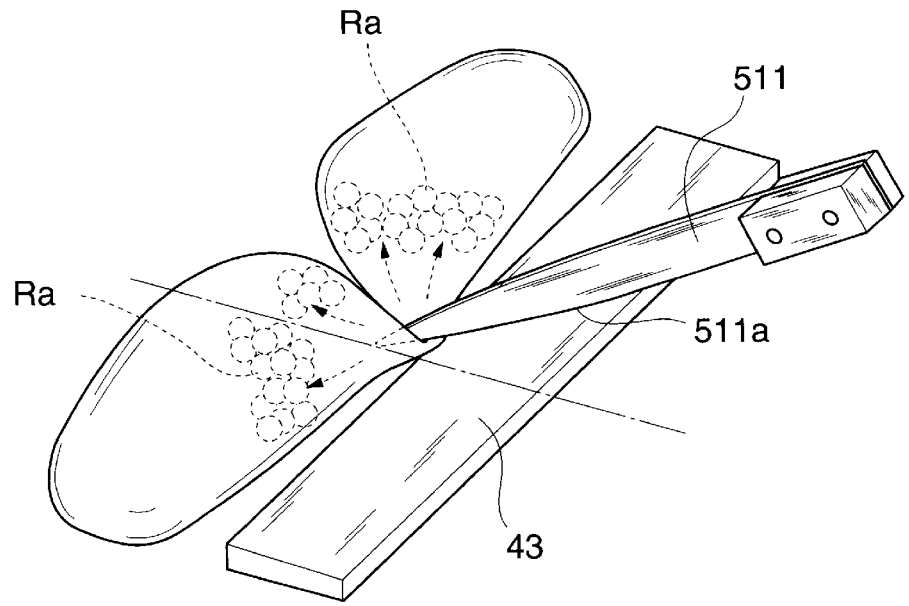
Figure 15:
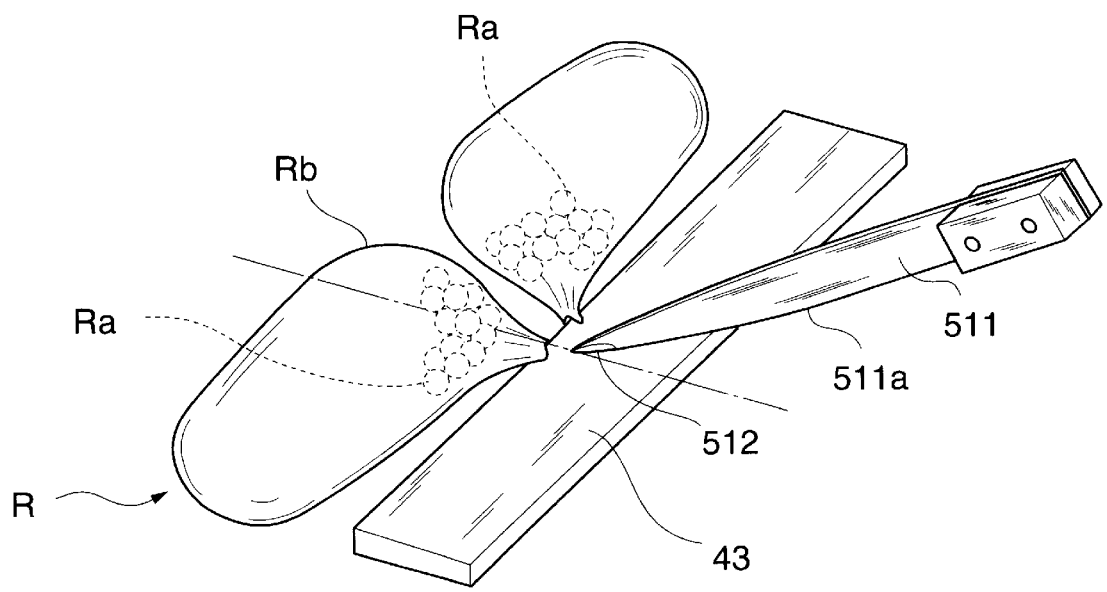
Figure 16:
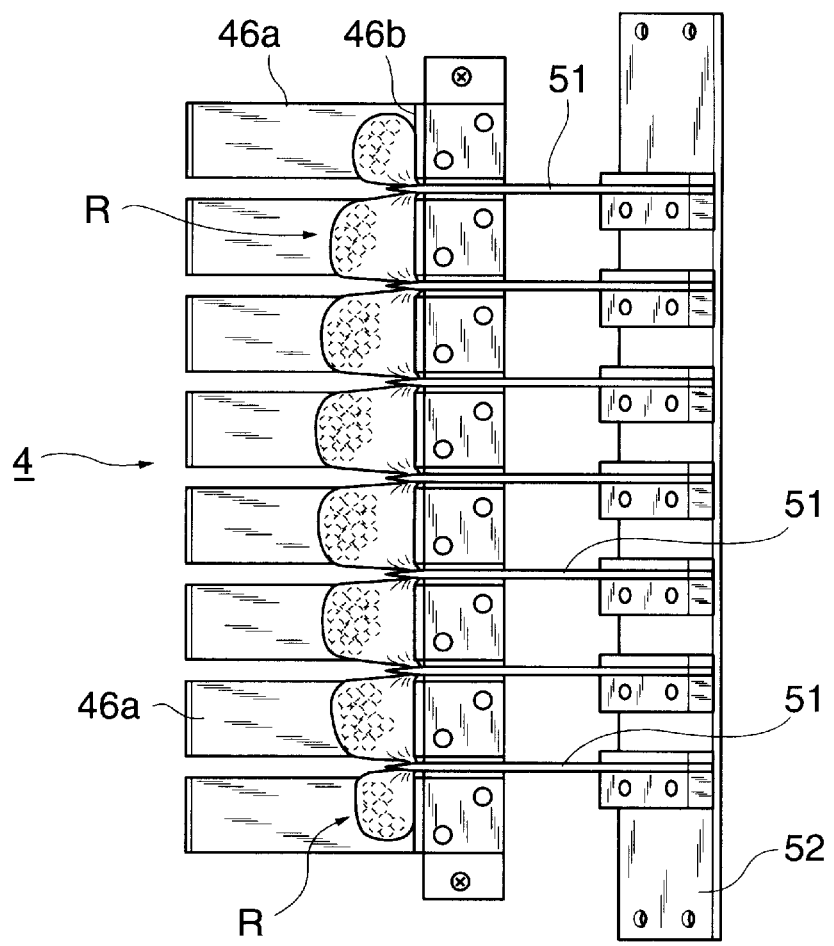
Figure 17:
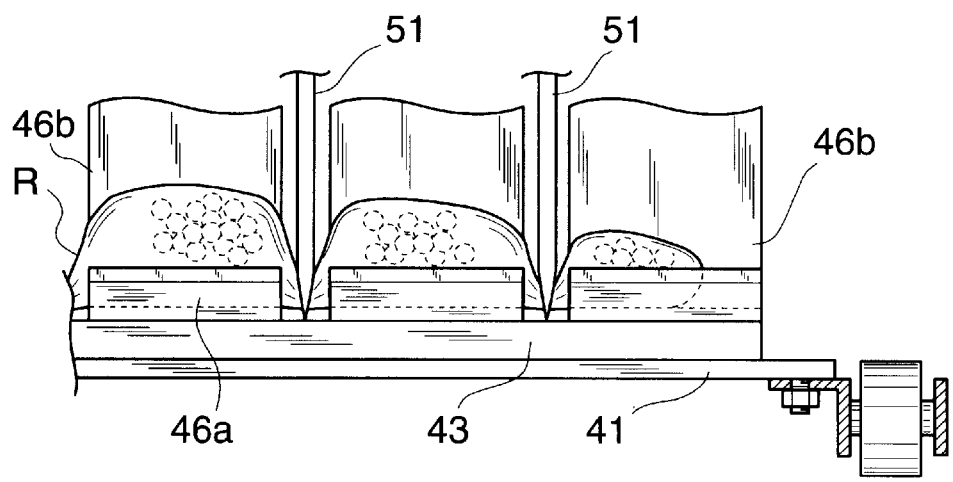

A cutting operation of the ovaries, i.e., roes of salmons of the present invention will be explained. In FIG. 1, a roe having a length of 30 cm and a diameter of 5 cm is intermittently supplied to the bucket portion 4 from a chute 6. As can be seen from the sectional view of the roe R in FIG. 9, some thousand eggs Ra are covered with a membrane Rb. As shown in FIG. 10, the supplied roe R is placed on a corner portion at which the receiving plate 46a and the pushing plate 46b are connected to each other and in this state, the roe R is transferred and approaches a lower portion of the cutter pieces 51. The roe R is further transferred, as shown in FIG. 11, the roe R is pushed by the pushing faces 511a of the cutter pieces 51. If this pushing state at that time is seen from front, as shown in FIG. 13, the membrane Rb of the roe is gradually pushed at predetermined distances and thus, the eggs are divided into plurality of clusters without being destroyed. If the roe R is further transferred leftward from the position shown in FIG. 11, since each the receiving plate 46a has the predetermined inclining angle α as shown in FIG. 12, the blades 512 at the tip ends of the cutter pieces 51 relatively float up from the distance D between the receiving plates 46a and the pushing plates 46b and only the membranes Rb are cut. FIGS. 14 to 17 show this state clearly. As shown in FIG. 14, the membrane Rb or the roe R is locally pushed by the pushing face 511a on the end face of the pushing portion 511 of the cutter piece 51, thereby separating the eggs Ra in the membrane Rb. At that time, the membrane Rb is not yet cut. Lastly, as shown in FIGS. 15 to 17, only the membrane Rb is cut by the blade 512 on the tip end of the cutter piece 51. FIGS. 16 and 17 show the cutting state of the entire roe. The roe is cut and separated into eight pieces. In this manner, according to this cutting method, only the membrane Rb is cut without destroying the eggs Ra and thus, the leaking amount of drip is extremely small.

Figure 18:
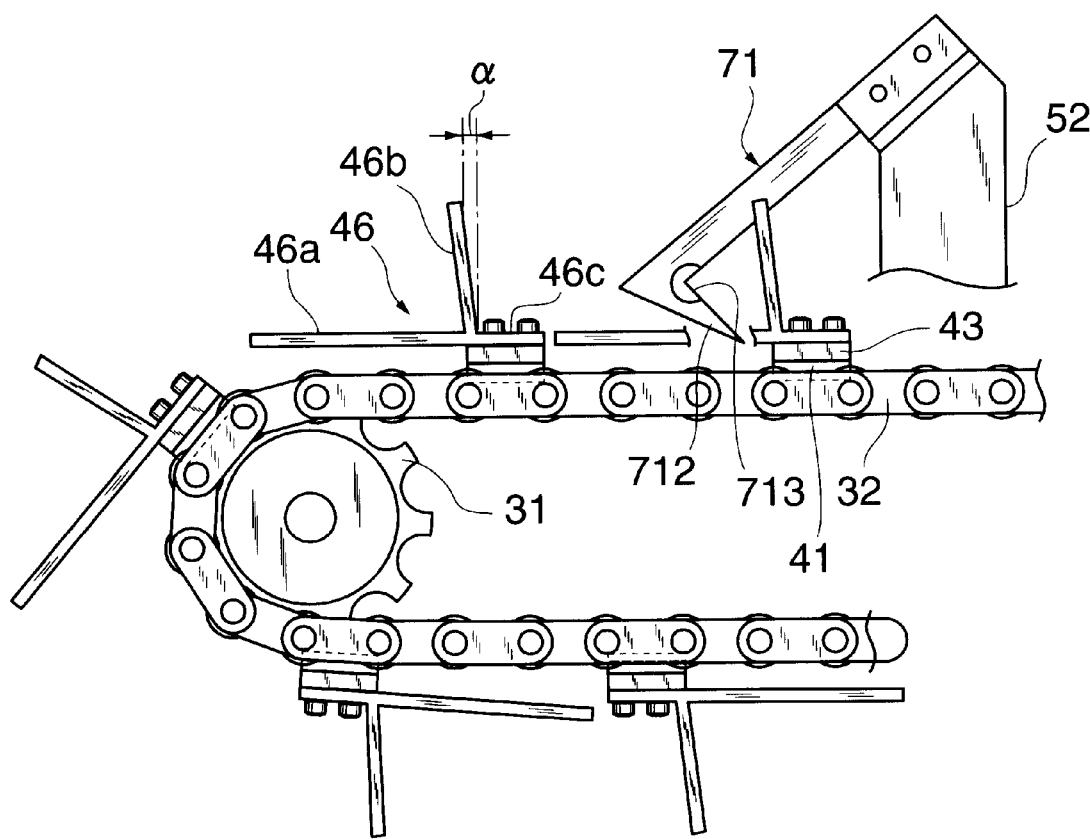

Next, a second embodiment of the present invention will be explained with reference to FIGS. 18 to 22. The frame 2 and the transfer means 3 are substantially the same as those shown in the first embodiment. A structure of the bucket portion 4 is almost the same as that of the first embodiment, but is different in that the receiving plate 46a of the bucket piece 46 of the bucket portion is formed horizontally, and the pushing plate 46b is inclined at the angle α toward the traveling direction as shown in FIG. 18.

Figure 19:
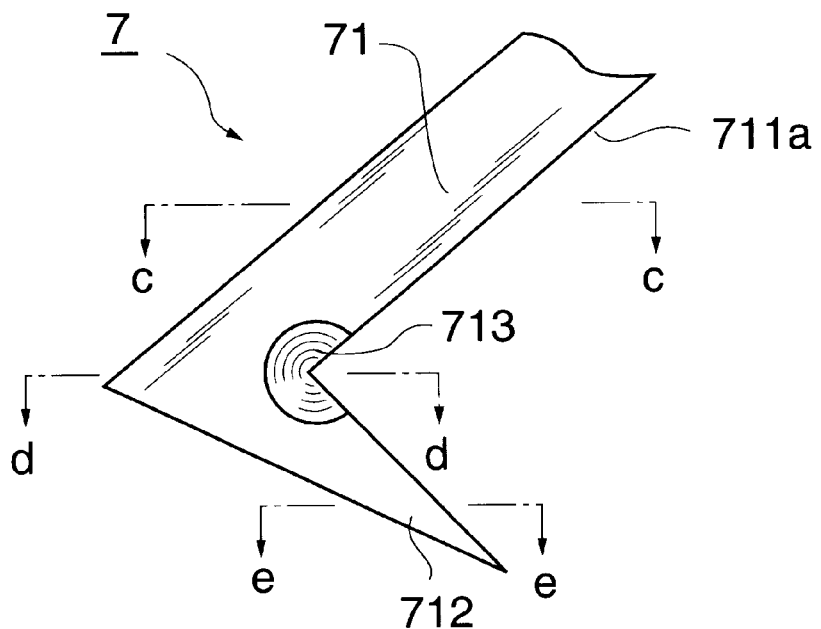
Figure 20:
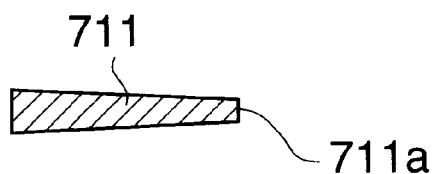
Figure 21:
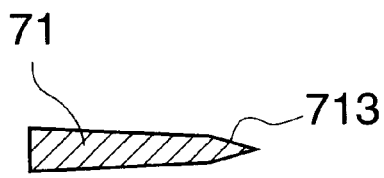
Figure 22:
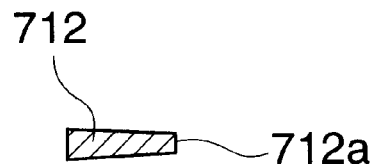

A structure of cutter means 7 has a biggest difference. As shown in FIGS. 18 and 19, each cutter piece 71 comprises a portion altogether inclining in the traveling direction and downward as in the first embodiment, and a tip end 712 having an inner face bent substantially at 90° in a direction opposite from the traveling direction. A blade 713 is formed on an inner face of the bent portion. This portion will be explained in more detail. The portion 711 of the cutter piece 71 inclining downward is formed as a pushing portion. A cross section of the pushing portion is shown in FIG. 20, and one end face thereof is a first pushing portion 711a. A cross section of the bent portion is shown in FIG. 21, an inner end face of the bent portion is formed as a blade 713, and an inner end face of the tip end 712, which is lower than the bent portion, is formed as a second pushing portion 712. The tip end 712 of the cutter piece 71 is located slightly higher than an upper face of the chopping board 43.

Figure 23:
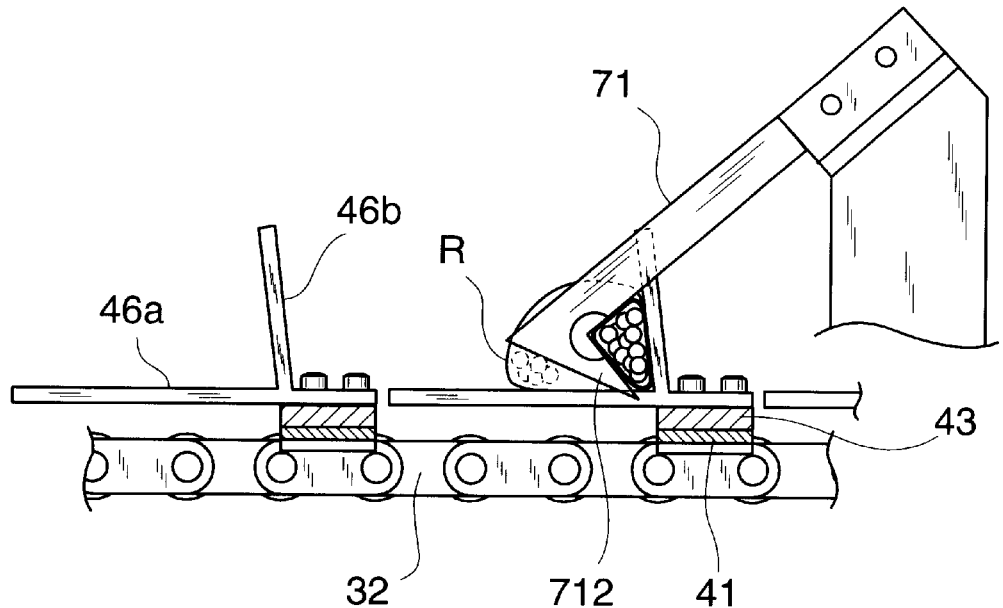
Figure 24:
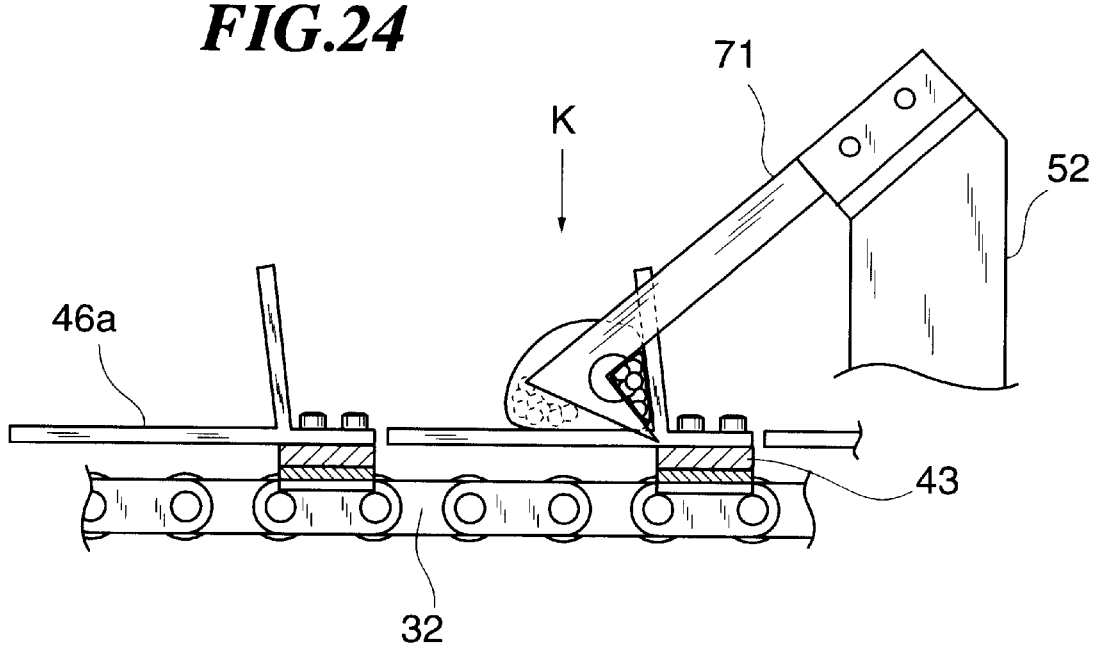
Figure 25:
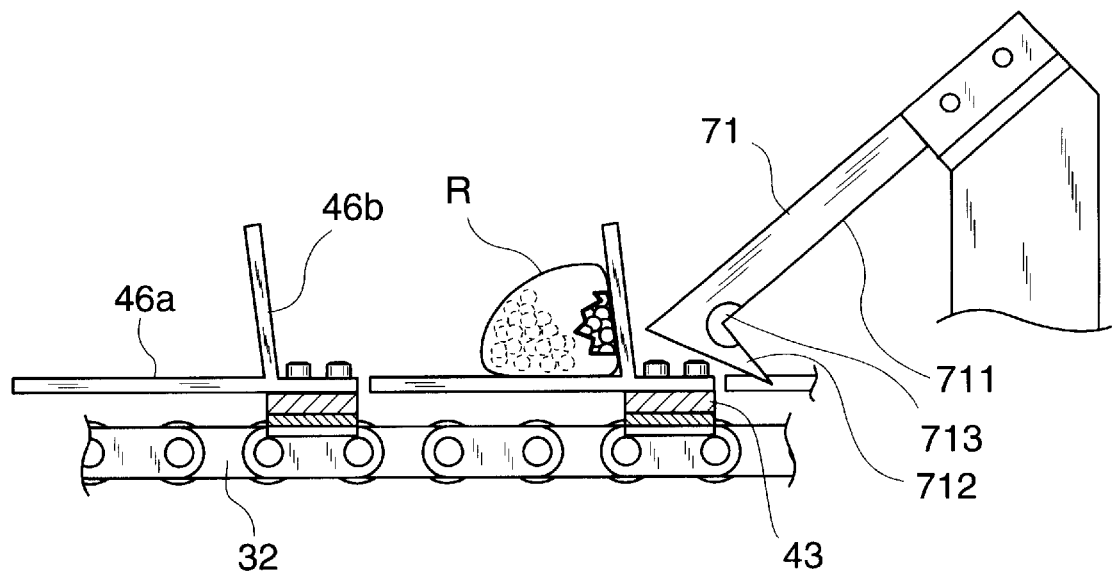
Figure 26:
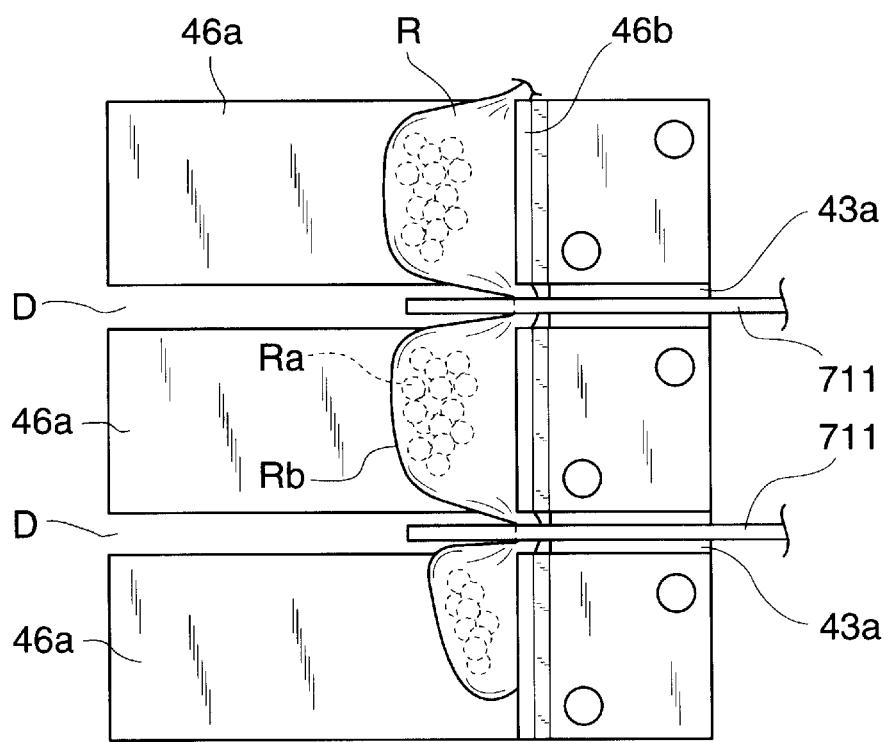

The cutting operation of roes according to the second embodiment will be explained with reference to FIGS. 23 to 26. As in the first embodiment, a roe R intermittently supplied from the chute 6 is sent in the bucket portion 4, and the roe approaches the cutter means 7. As shown in FIG. 23, the roe R is located on the angle portion between the receiving plate 46a and the pushing plate 46b. The roe R is first pushed by the first pushing portion 711a and the second pushing portion 712a of each of the cutter piece 71. FIG. 26 shows this state. The membrane Rb is shrunk and deformed by the pushing portions 711a and 712a, and the eggs Ra in the membrane Rb are divided into a plurality of clusters, but the membrane Rb is not yet cut at that time. If the bucket portion 4 further moves, the membrane Rb of the roe R converges to a front face of the blade 713 of the cutter piece 71, and only the membrane is cut and the roe is cut into a plurality of clusters. FIG. 25 shows a state thereof after the roe was cut.

A third embodiment of the present invention will be explained with reference to FIGS. 27 to 33. The frame 2 and the transfer means 3 are substantially the same as those of the first embodiment, the structure of the bucket portion 4 is almost the same as that of the second embodiment, and the same elements are designated with the same symbols.

Figure 27:
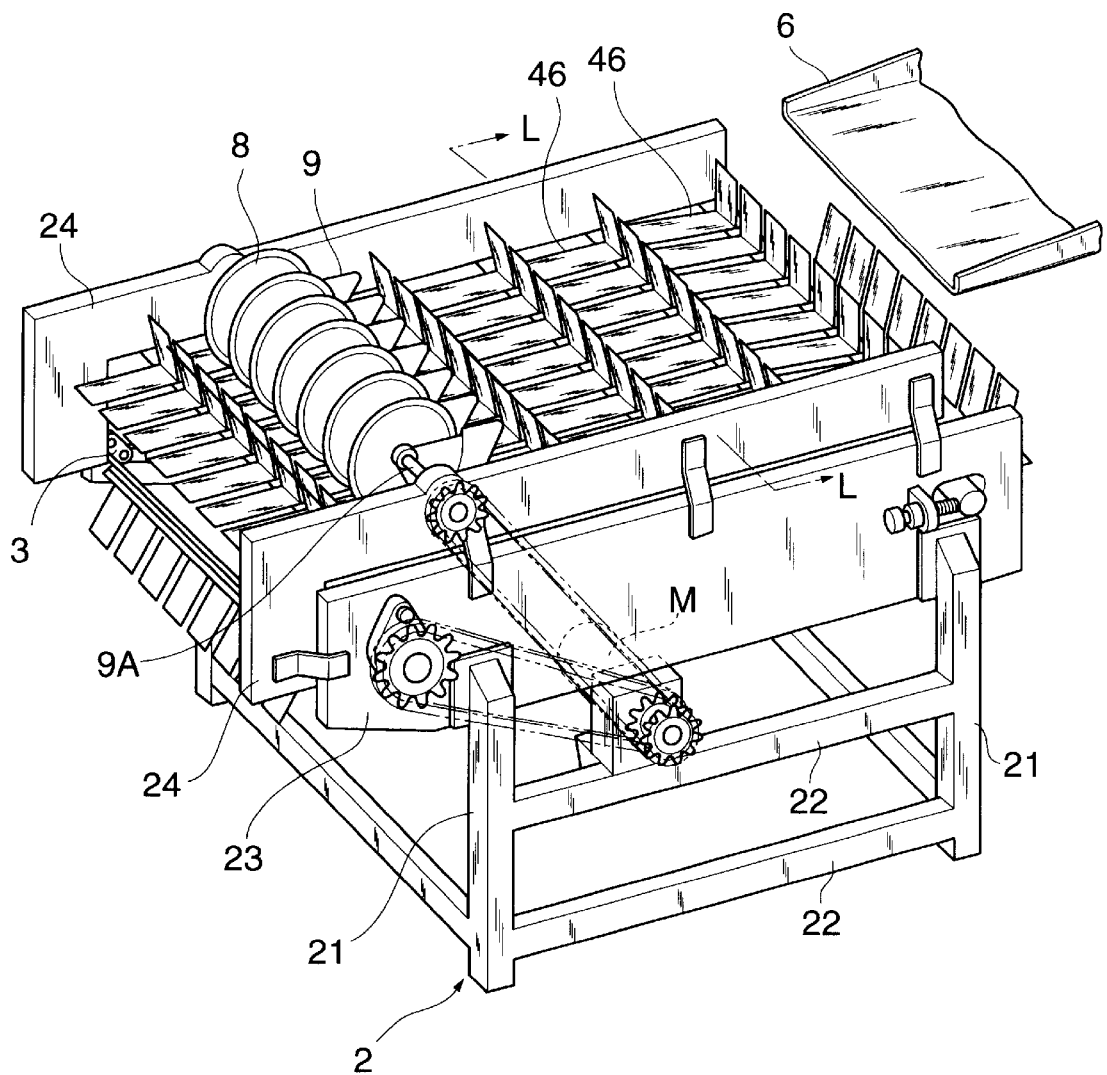
Figure 28:
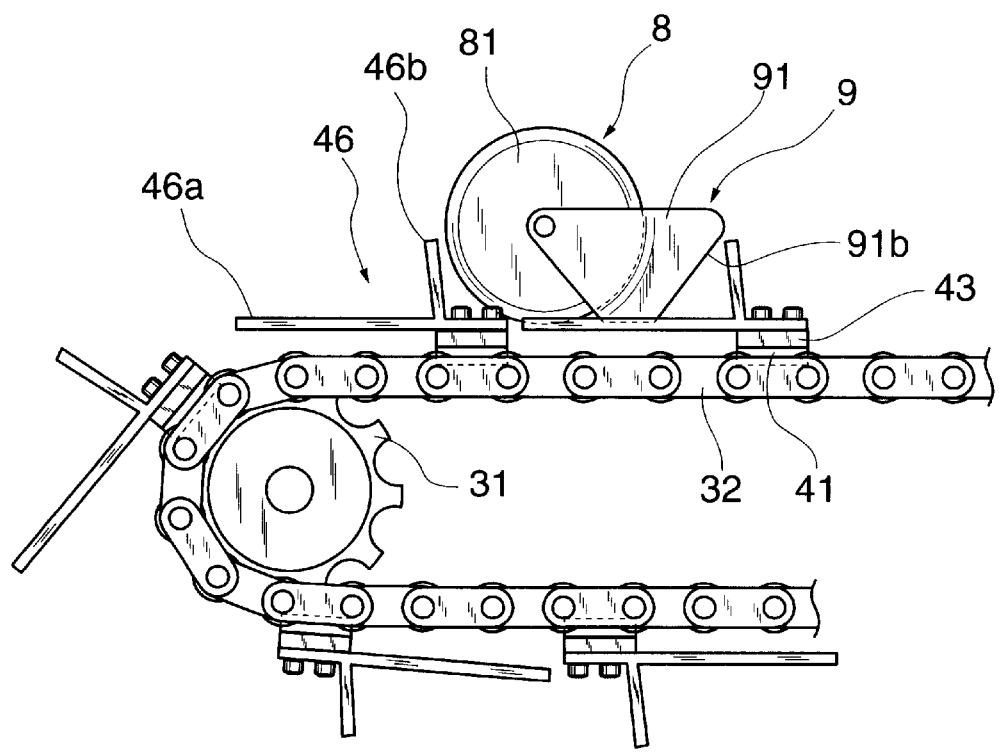
Figure 29:
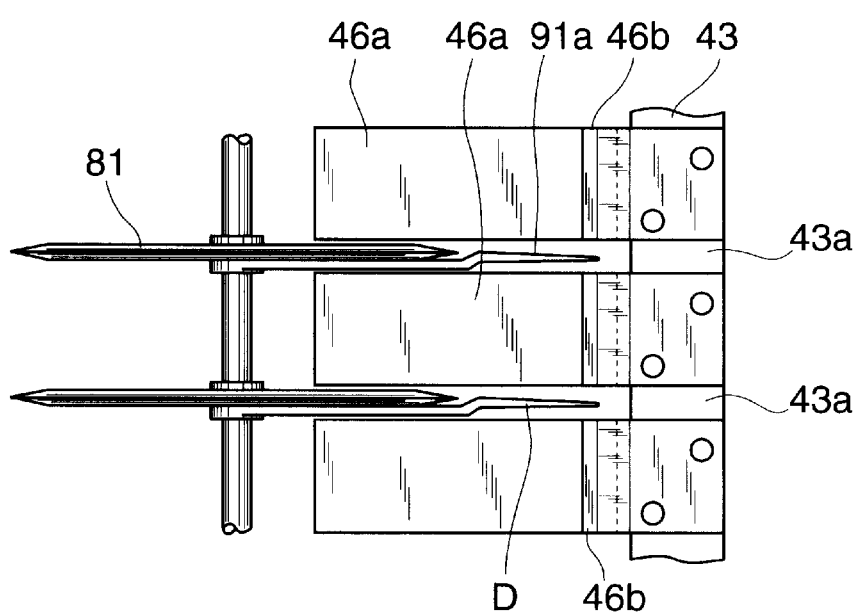
Figure 30:
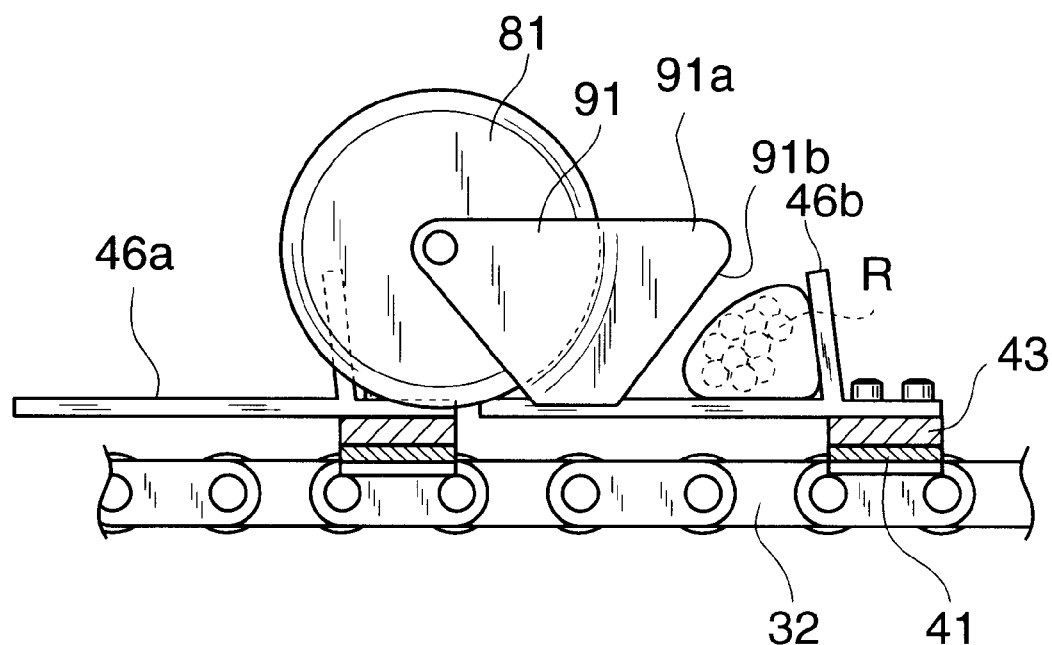
Figure 31:
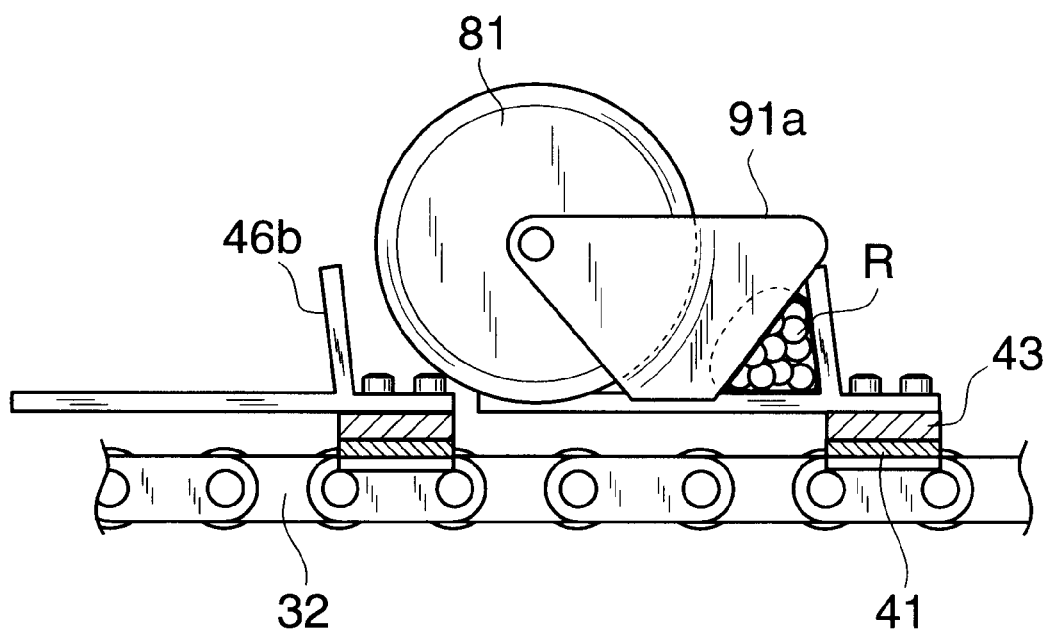

As shown in FIG. 27, the third embodiment is characterized in structures of a rotation cutter 8 constituting cutter means and pushing means 9. The rotation cutter 8 comprises a plurality of rotating blades 81 each formed at its outer periphery with a blade edge, and a plurality of pushing plates 91 respectively paired with the rotating blades 81. Rotation force of a driving motor M of the transfer means 3 is divided, and the rotating cutter 8 is rotated by the divided rotating force. A front face of the pushing plate 91 is of inverted trapezoidal shape as shown in FIG. 28. The pushing plate 91 is supported coaxially with the rotating blade 81. As shown in FIG. 29, a front half 91a of the pushing plate 91 is in the same plane as the rotating blade 81 in each the gap D between the receiving plate 46a and the pushing plate 46b. A lower face of the pushing plate 9 is located and held such that the lower face slides on an upper face of a portion 43a of the chopping board 43. An inclining face of the front face 91a of the pushing plate 91 is formed as a pushing face 91b.

Figure 32:
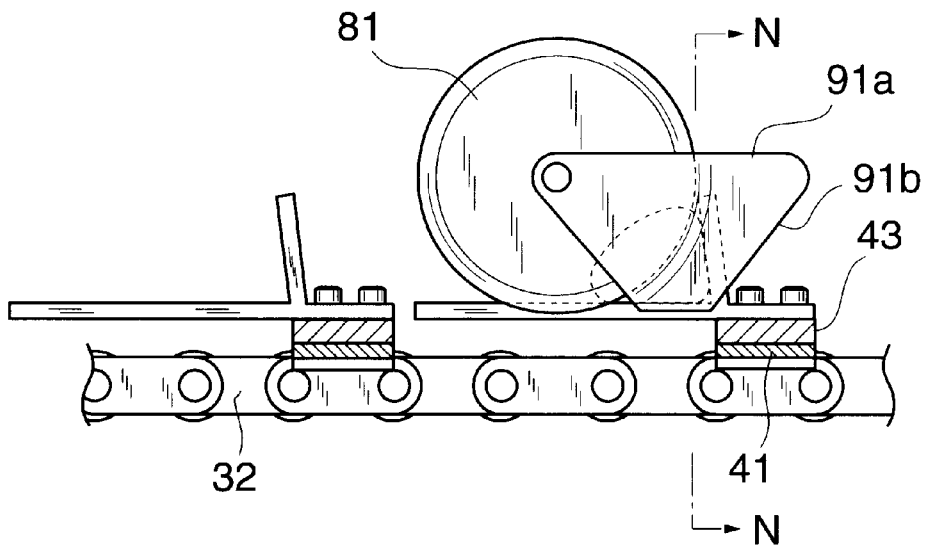
Figure 33:
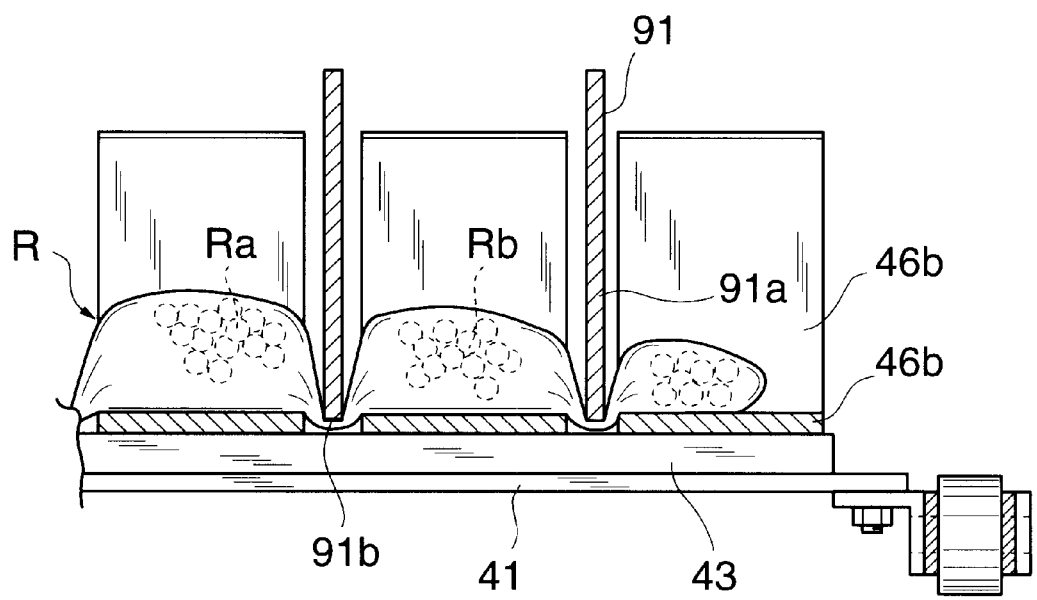

According to the third embodiment, a roe is supplied from the chute 6 and dropped on each bucket piece 46 of the bucket portion 4 and approaches the pushing plate 91. FIG. 26 shows this state. The roe R is located at the angle portion between the receiving plate 46a and the pushing plate 46b, and as the roe R moves leftward in the drawing, the roe is pushed by the pushing face 91b of the inclining face of the front half 91a of the pushing plate 91. FIG. 33 shows this state. The membrane Rb is shrunk and deformed by the pushing portion, and the eggs Ra in the membrane Rb are divided into a plurality of clusters, but the membrane Rb is not yet cut at that time. If the bucket piece 46 further moves leftward, and the membrane Rb is cut by the rotating blade 81 as shown in FIG. 32, and the roe is cut into a plurality of clusters, i.e., into bite-size portions.

What is claimed is:

1. A cutting method for cutting a salmon ovary comprising the steps of:

holding and transferring the salmon ovary in a whole state;

applying blunt pushing pressure to a membrane of the salmon ovary at localized areas spaced by predetermined gaps during the transferring to displace eggs within the membrane into a plurality of clusters without cutting the membrane; and cutting the membrane at the localized areas after the eggs are displaced from the localized areas to cut the salmon ovary into a plurality of portions while minimizing rupture of the eggs by the displacement of the eggs.

2. A cutting apparatus for cutting a salmon ovary comprising:

a bucket portion for holding the salmon ovary;

transfer means for transferring in a transfer direction the bucket portion along a transfer path;

cutter means for cutting the salmon ovary into a plurality of clusters as the salmon ovary is transferred past the cutter means in the bucket portion;

the bucket portion including a plurality of bucket pieces for holding the salmon ovary that are disposed spaced apart at predetermined gaps with the cutter means disposed at the gaps to pass through the gaps during the transferring of the bucket portion;

the cutter means including pushing portions and blades;

the pushing portions being configured to divide eggs of the salmon ovary by pushing a membrane of the salmon ovary at localized areas aligned with the gaps during the transferring to displace the eggs within the membrane into a plurality of clusters without cutting the membrane; and the blades being disposed to cut the membrane at the localized areas which exists between the eggs after the eggs are displaced from the localized areas.

3. The cutting apparatus according to claim 2, wherein each of the bucket pieces includes a receiving plate and a pushing plate.

4. The cutting apparatus according to claim 2, wherein the transfer means comprises driving and follower sprockets, a chain wound around the driver and follower sprockets, a mounting plate mounted to the chain, and a chopping board secured to the mounting plate supporting the bucket pieces.

5. The cutting apparatus according to claim 2, wherein the cutter means include cutter pieces disposed to pass through the gaps and including the pushing portions and the blades wherein the blades are provided only at tip ends of the cutter pieces with the pushing portions being provided at intermediate portions.

6. The cutting apparatus according to claim 2, wherein the cutter means includes cutter pieces disposed to pass through the gaps and including the pushing portions and the blades, the cutter pieces having bent portions with the blades provided at an inflection point of the bent portions with the pushing portions being provided above and below the blades.

7. The cutting apparatus according to claim 2, wherein the cutter means includes cutter pieces including each of said blades being a rotating blade and the pushing portions being provided in front of the blades and having a pushing face located in a common plane of the rotating blade.

8. The cutting apparatus according to claim 3, wherein the pushing plate of the bucket piece is upwardly inclined at a predetermined angle from vertical in the transfer direction of the bucket piece.

9. The cutting apparatus according to claim 3, wherein the bucket piece is upwardly inclined at a predetermined angle from horizontal in the transfer direction of the bucket piece.

10. The cutting apparatus according to claim 4, wherein the bucket pieces are mounted to the chopping board at the predetermined gaps from one another in a direction orthogonal to the transfer path.

11. The cutting apparatus according to claim 5, wherein the cutter pieces are upwardly inclined in a direction opposite the transfer direction and the tip ends of the cutter pieces are disposed to contact a chopping board which supports the bucket pieces and extends across the gaps.

12. The cutting apparatus according to claim 6, wherein ones of the pushing portions disposed below the blades upwardly inclined in the transfer direction, and ones of the pushing portions disposed above the blades are upwardly inclined in a direction opposite from the transfer direction.

13. The cutting apparatus according to claim 7, wherein each of the pushing portions is a pushing plate with a lower face located and held such that the lower face slides on an upper face of a chopping board which supports the bucket pieces and extends across the gaps.

14. The cutting apparatus according to claim 7, wherein each of the pushing portions includes a pushing plate providing the pushing faces upwardly inclined opposite the transfer direction for pushing the membrane.

* * * * *